(12) United States Patent
Zhou et al.

(10) Patent No.: US 8,699,429 B2
(45) Date of Patent: Apr. 15, 2014

(54) WIRELESS COMMUNICATION SYSTEM AND WIRELESS COMMUNICATION METHOD

(75) Inventors: Hua Zhou, Beijing (CN); Jie Zhang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 12/525,024

(22) PCT Filed: Aug. 31, 2007

(86) PCT No.: PCT/CN2007/070609
§ 371 (c)(1),
(2), (4) Date: Feb. 4, 2010

(87) PCT Pub. No.: WO2009/026769
PCT Pub. Date: Mar. 5, 2009

(65) Prior Publication Data
US 2010/0166097 A1 Jul. 1, 2010

(51) Int. Cl.
*H04W 52/24* (2009.01)
*H04W 52/26* (2009.01)
*H04B 10/04* (2011.01)
*H04B 7/00* (2006.01)
*H04L 1/02* (2006.01)

(52) U.S. Cl.
USPC ........... 370/329; 370/328; 370/336; 370/342; 370/352; 455/45; 455/69; 375/285; 375/296; 375/221; 375/261

(58) Field of Classification Search
USPC ........... 370/328–463; 455/428–455, 285–296
See application file for complete search history.

(56) References Cited

U.S. PATENT DOCUMENTS

| 7,929,636 | B2 * | 4/2011 | Kotecha | 375/285 |
| 8,179,775 | B2 * | 5/2012 | Chen et al. | 370/203 |

(Continued)

FOREIGN PATENT DOCUMENTS

| JP | 2006191620 A | 7/2006 |
| JP | 2009506729 A | 2/2009 |
| JP | 2009526466 | 7/2009 |
| WO | 2007027825 A2 | 3/2007 |
| WO | 2007091836 A1 | 8/2007 |

OTHER PUBLICATIONS

Part 16: Air Interface for Fixed Broadband Wireless Access Systems, IEEE P802.16 (Draft Mar. 2007), Revision of IEEE Std 802.16-2004, as amended by IEEE Std 802.16f-2005 and IEEE 802.16e-2005, (Dec. 2007).

(Continued)

*Primary Examiner* — Ayaz Sheikh
*Assistant Examiner* — Venkatesh Haliyur
(74) *Attorney, Agent, or Firm* — Smith, Gambrell & Russell, LLP

(57) ABSTRACT

There is provided a MIMO wireless communication system, which comprises at least one base station having plural transmitting antennas and at least one user equipment having at least one receiving antennas, the base station being capable of accommodating plural user equipments by precoding based on a codebook, wherein, each of the plural user equipments comprises: a channel estimation unit for conducting a channel estimation based on a pilot signal transmitted from the base station, to obtain a channel information; a codeword determination unit for determining a first codeword that results in the maximum signal-noise-ratio, and at least one second codeword that results in the minimum signal-noise-ratio, based on the channel information; and a transmission unit for feedbacking the first codeword and the second codeword(s) to the base station, the base station is configured to schedule the user equipments based on the first codeword and the second codeword so that a predetermined system performance metric is optimized.

12 Claims, 3 Drawing Sheets

(56) References Cited

U.S. PATENT DOCUMENTS

| | | | |
|---|---|---|---|
| 2008/0013610 A1* | 1/2008 | Varadarajan et al. | 375/221 |
| 2008/0032630 A1* | 2/2008 | Kim et al. | 455/45 |
| 2008/0080635 A1* | 4/2008 | Hugl et al. | 375/267 |
| 2008/0108310 A1* | 5/2008 | Tong et al. | 455/69 |
| 2008/0125051 A1* | 5/2008 | Kim et al. | 455/67.13 |
| 2009/0252251 A1* | 10/2009 | Tosato et al. | 375/267 |
| 2010/0166097 A1* | 7/2010 | Zhou et al. | 375/267 |

OTHER PUBLICATIONS

3GPP R1-072422, NTT DoCoMo, Investigation on Precoding Scheme for Mu-MIMO in E-UTRA Downlink 3GPP TSG RAN WG1 Meeting #49 Kobe, Japan, May 7-11, 2007.

3GPP, R1-060335, Samsung, "Downlink MIMO for EUTRA" 3GPP TSG RAN WG1 Meeting #44 Denver, USA, Feb. 13-17, 2006.

3GPP, R1-060495, Huawei, "Precoded MIMO concept with system simulation results in macro cells", 3GPP TSG RAN WG1 Denver, USA Feb. 13-17, 2006.

3GPP, R1-062483, Philips, "Comparison between MU-MIMO codebook-based channel reporting techniques for LTE downlink" 3GPP TSG RAN WG1 Meeting #46bis Seoul, South Korea, Oct. 9-13, 2006.

3GPP, R1-071510, Freescale Semiconductor Inc, "Details of Zero-forcing MU-MIMO for DL EUTRA" 3GPP TSG RAN WG1 #48bis, St. Julian's, Malta, Mar. 2007.

Notification of Reason for Refusal dated Sep. 4, 2012 received in Japanese Patent Application No. 2010-522161.

English translation of Examiner's Decision of Refusal Japanese Office Action dated Mar. 19, 2013 issued in Patent Application No. 2010-522161.

* cited by examiner

WIRELESS COMMUNICATION SYSTEM AND WIRELESS COMMUNICATION METHOD

TECHNICAL FIELD

This invention generally relates to wireless communication, and more particularly, to user scheduling in a MU-MIMO (multi-user multiple input multiple output) wireless communication system.

BACKGROUND OF THE INVENTION

MU-MIMO (Multiple User-Multiple Input Multiple Output), which is a communication technology enabling multiple terminals each having plural antennas to communicate simultaneously with one control station having plural antennas, has been a great enabler for high efficiency data transmission in cellular wireless network. There have been many proposals on how to support multi-user transmission on the same MIMO channel [documents 2~6].

Basically, in terms of channel state information availability at the transmitter, these proposals can be categorized into two classes, one is called "codebook based", which don not need full channel information at the transmitter, but only the quantized channel vector (in the form of channel vector index feedback), the other one is called "non-codebook based", which needs full channel information at the transmitter, by means of possible uplink sounding method, which means each user equipment send a common pilot signal through feedback channel so that the base station can detect the channel. The present invention is directed to codebook based MU-MIMO.

Currently, in 3GPP LTE (3$^{rd}$ Generation Partnership Project, Long Term Evolution), there are two main kinds of proposals for MU-MIMO under the codebook based scheme: unitary precoding (document 3) and non-unitary precoding (document 1). "Unitary" means the codeword in the same codeword matrix are orthogonal; on the other hand, "non-unitary" means that the codeword in the codebook are not orthogonal.

FIG. 1 shows schematically the MU-MIMO precoding scheme of the related art. As shown in FIG. 1, the base station schedules users and determines the data rate based on the CQI (Channel Quality Indictor) and PVI (Precoding Vector Index) feedbacked from the user equipments, then the data for each scheduled user can be channel-coded and modulated, and precoded with some weight vector based on PVI, combined with data for other users, and then transformed by IFFT and added by Cyclic Prefix (CP) in case of OFDM scheme, at last transmitted on each transmitter antenna. Here, the IFFT and CP unit can be omitted in case of multiplexing schemes other than OFDM.

In FIG. 1, each user equipment (mobile station) is shown to have a single receiver antenna, however, the user equipments can have plural receiver antennas. The data received by the receiver antenna undergoes CP removal and FFT transform, then user-specific data is extracted by receive combination method (or MIMO detection method). It should be noted that the CP removal and FFT transform units can be omitted in case of any system other than OFDM. At the same time, channel estimation is performed based on common pilot or dedicated pilot, then CQI is computed and PVI is determined before feedback to base station for the next schedule slot.

FIG. 2 shows an example of precoding scheme for 2-user 2-Tx MU-MIMO. As shown in FIG. 2, the data for user 1 ($d_1$) and the data for user 2 ($d_2$) are weighted by vectors [$w_{11}$, $w_{12}$], and [$w_{21}$, $w_{22}$], respectively, and are added together on each transmitter. In this example, precoding vectors [$w_{11}$, $w_{12}$], and [$w_{21}$, $w_{22}$] are selected from one common codebook known to both base station and user equipments. At each receiver, the data can be extracted by utilizing the interference avoidance nature of precoding codebook.

In unitary precoding, the codebook with orthogonal vectors can be constructed by some basic math rule, for example, the top $n_T$ rows of DFT matrix with the size N ($=2^B$) can be such kind of codebook, as indicated by the following equation, $$f_n(l) = \exp\left(-\frac{j2\pi nl}{N}\right), l = 0, \ldots, n_T; n = 0, \ldots, N-1 \quad (1)$$

wherein, $f_n(l)$ is the l-th element of the n-th vector, $n_T$ is the number of transmitting antennas, and N is the size of the codebook, j is the imaginary number. In unitary precoding, the codebook is unitary matrix-based, i.e., N vectors compose P=N/M unitary matrices, where M is the number of transmitting streams, and the p-th unitary matrix is denoted as Fp=[$f_p$, $f_{p+P}$, $f_{p+2P}$, ... ] (p=0, ..., P−1). The same unitary matrix-based codebook is utilized at both the Node B (base station) and UE side in unitary precoding. In unitary precoding, the CQI can be computed as:

$$CQI_k = \operatorname*{argmax}_{i,j \in [1, \ldots P]} \left(\frac{|H_k F_i|^2}{\sigma^2 + \sum_{j \neq i} |H_k F_j|^2}\right) \quad (2)$$

wherein H is a channel matrix, F is a weighting matrix, $\sigma^2$ is a noise power, and k is an user index.

Note that the CQI computation takes into account all interference from other precoding vector except its own signal. In this case, the CQI is heavily underestimated, so that the throughput of the system is not exploited sufficiently. On the other hand, in non-unitary precoding, the CQI is computed as:

$$CQI_k = \operatorname*{argmax}_{i,j \in [1, \ldots P], |F_i F_j|^2 < P_{thrd}} \left(\frac{|H_k F_i|^2}{\sigma^2 + |H_k F_j|^2}\right) \quad (3)$$

Here, F is a weighting matrix from a non-orthogonal codebook. Although the CQI computation considers the interference from other streams, but it cannot be guaranteed the user that the BS selects will really use the precoding index determined in the CQI computation. Therefore, the CQI computation will also possibly mismatch with the realistic capacity.

Thus it can be seen that the related art MU-MIMO precoding schemes compute the best CQI, and feedback the CQI and corresponding precoding vector index to the base station. All these schemes without exception either overestimate the interference for unitary precoding, or cause possible mismatch when blindly selecting users for non-unitary precoding. Therefore the throughput of the system can not be maximized.

Document 1: Part 16: Air Interface for Fixed Broadband Wireless Access Systems, IEEE P802.16 (Draft March 2007), Revision of IEEE Std 802.16-2004, as amended by IEEE Std 802.16f-2005 and IEEE 802.16e-2005.

Document 2: 3GPP R1-072422, NTT DoCoMo, "Investigation on precoding scheme for MU-MIMO in E-UTRA downlink".

Document 3: 3GPP, R1-060335, Samsung, "Downlink MIMO for EUTRA".
Document 4: 3GPP, R1-060495, Huawei, "Precoded MIMO concept with system simulation results in macrocells".
Document 5: 3GPP, R1-062483, Philips, "Comparison between MU-MIMO codebook-based channel reporting techniques for LTE downlink".
Document 6: 3GPP, R1-071510, Freescale Semicoductor Inc, "Details of zero-forcing MU-MIMO for DL EUTRA".

SUMMARY OF THE INVENTION

Accordingly, the present invention is directed to a MU-MIMO precoding scheme that substantially obviate one or more of the problems due to limitations and disadvantages of the related art.

It is an object of the present invention to optimize performance metric of the system, for example to maximize the throughput of the MU-MIMO system.

It is another object of the present invention to schedule users more appropriately.

It is still another object of the present invention to compute the channel quality more accurately at the base station.

In order to achieve the above objects, in an aspect of the invention, there is provided a precoding method in a MIMO wireless communication system, wherein the MIMO wireless communication system comprises at least one base station having multiple transmitting antennas and at least one user equipment having at least one receiving antenna, the base station is capable of accommodating plural user equipments by precoding based on a codebook, the method comprising: each of the plural user equipments conducting a channel estimation based on a pilot signal transmitted from the base station, to obtain a channel information; determining a first codeword that results in the maximum SNR, and at least one second codeword that results in the minimum SNR, based on the channel information; and feedbacking the first codeword and the second codeword(s) to the base station, and, the base station scheduling the user equipments based on the first codeword and the second codeword(s) so that a predetermined system performance metric is optimized.

In another aspect of the invention, there is provided an user equipment in a MIMO wireless communication system that comprises at least one base station having multiple transmitting antennas and at least one user equipment having at least one receiving antennas, wherein the base station is capable of accommodating plural user equipments by precoding based on a codebook, the user equipment comprises: a channel estimation unit for conducting a channel estimation based on a pilot signal transmitted from the base station, to obtain a channel information; a codeword determination unit for determining a first codeword that results in the maximum signal-noise-ratio, and at least one second codeword that results in the minimum signal-noise-ratio, based on the channel information; and a transmission unit for feedbacking the first codeword and the second codeword(s) to the base station.

In another aspect of the invention, there is provided a MIMO wireless communication system, which comprises at least one base station having plural transmitting antennas and at least one user equipment having at least one receiving antennas, the base station being capable of accommodating plural user equipments by precoding based on a codebook, wherein, each of the plural user equipments comprises: a channel estimation unit for conducting a channel estimation based on a pilot signal transmitted from the base station, to obtain a channel information; a codeword determination unit for determining a first codeword that results in the maximum signal-noise-ratio, and at least one second codeword that results in the minimum signal-noise-ratio, based on the channel information; and a transmission unit for feedbacking the first codeword and the second codeword(s) to the base station, the base station is configured to schedule the user equipments based on the first codeword and the second codeword so that a predetermined system performance metric is optimized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In which.

DETAILED DESCRIPTION OF THE INVENTION

The present invention now will be described in detail with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

[First Embodiment]

Figure 1:
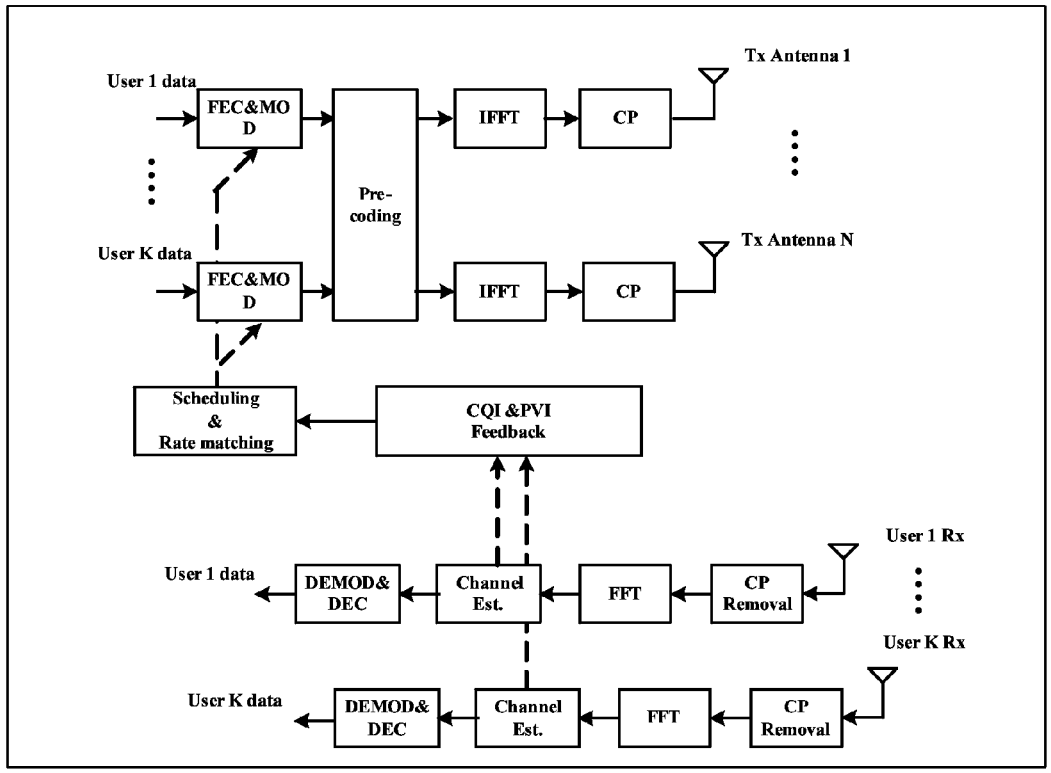
FIG. 1 shows schematically the related art MU-MIMO precoding scheme.
Figure 2:
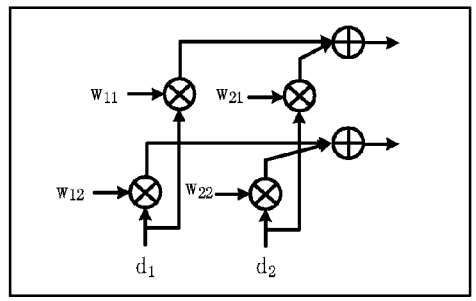
FIG. 2 shows an example of precoding scheme for 2-user 2-Tx MU-MIMO.

The general configuration of the MU-MIMO wireless communication system of the first embodiment is substantially the same as that shown in FIG. 1. In other words, the MU-MIMO wireless communication system of the first embodiment is applied in OFDM (Orthogonal Frequency Division Multiplexing) system. Reference will be made to FIG. 1 in the following description. However, as will be apparent from the following description, the present invention is not limited to OFDM system, and can be applied to any other systems other than OFDM.

As shown in FIG. 1, the MIMO wireless communication system of the first embodiment comprises at least one base station (only one shown in FIG. 1) and at least one user equipment, the base station is equipped with N transmitting antennas, and is capable of accommodating plural user equipments by precoding based on a codebook. The base station schedule users and determine the data rate based on the feedback CQI (Channel Quality Indictor) and PVI (Precoding Vector Index), then the data for each scheduled user can be channel coded and modulated, and precoded with weight vectors, combined with other user data, and then transformed by IFFT and added by Cyclic Prefix (CP), at last transmitted through each transmitting antenna.

Figure 3:
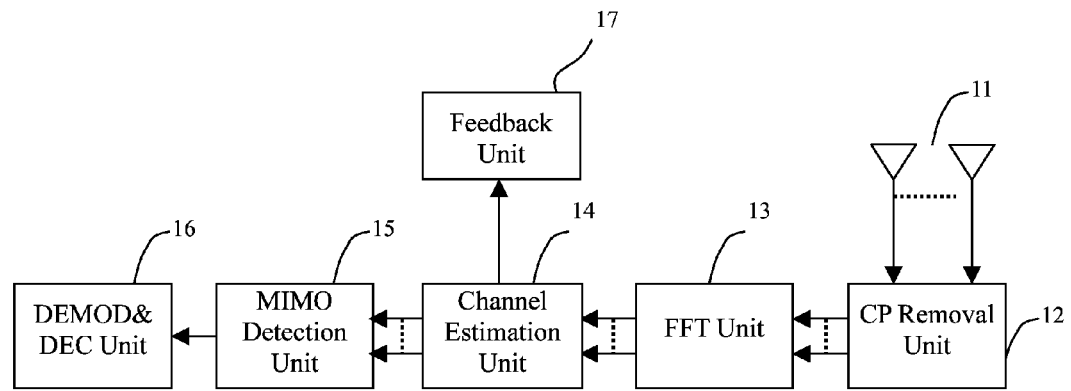
FIG. 3 is a schematic block diagram of the user equipment of the first embodiment of the present invention.

FIG. 3 is a schematic block diagram of the user equipment of the first embodiment. As shown in FIG. 3, the user equipment comprises at least one receiving antenna 11, a CP (cyclic prefix) removal unit 12, a FFT (Fast Fourier Transform) unit 13, a channel estimation unit 14, a MIMO detection unit 15, a DEMOD&DEC (demodulating and decoding) unit 16, and a feedback unit 17.

The receiving antennas 11 receive a plurality of multi-plexed data streams. The CP removal unit 12 removes a CP portion from the data streams received by the antennas 11. The FFT unit 13 performs a FFT process on the CP-removed data streams. The channel estimation unit 14 estimates the channels (streams) using pilot components included in the data streams, and provides the estimated channel matrix to the feedback unit 17. Using the estimated channel matrix, the MIMO detection unit 15 detects data streams transferred from different receive antennas and processed by the FFT unit 13. The DEMOD&DEC unit 16 demodulates the data processed by the MIMO detection unit 15 and decodes the demodulated data into user data.

Figure 4:
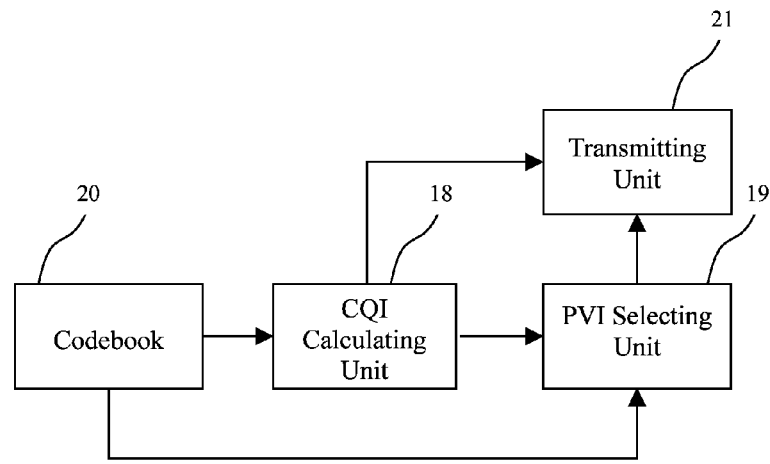
FIG. 4 is a schematic block diagram of the feedback unit.

FIG. 4 is a schematic block diagram of the feedback unit 17 shown in FIG. 3. The feedback unit 17 includes a CQI calculating unit 18, a PVI determination unit 19, a codebook 20, and a transmitting unit 21.

The codebook 20 contains codewords for precoding data streams transmitted from a control station (e.g. a base station). The CQI calculating unit 18 generates a channel quality indictor (CQI) based on the estimated channel matrix information. In this embodiment, the CQI calculating unit 18 calculates the biggest SNR, and at least one smallest SNR as the CQIs. The SNR is computed by assuming that there are precoding weighting at the control station, and also prescribed MIMO decoding method at the UE side, such as ZF (Zero-Forcing) or MMSE (Minimal Mean Squire Error), or other methods. The precoding weighting vector is determined by the PVI determination unit 19. The PVI determination unit 19 selects the appropriate precoding codewords corresponding the biggest SNR and at least one smallest SNR from the codebook 20. One PVI corresponds to one codeword in the codebook 20 by predetermined mapping rule which is known to both control station and user equipments.

Further, PVIs of the determined codewords and the CQIs are feedbacked to the base station by the transmitting unit 21.

Figure 5:
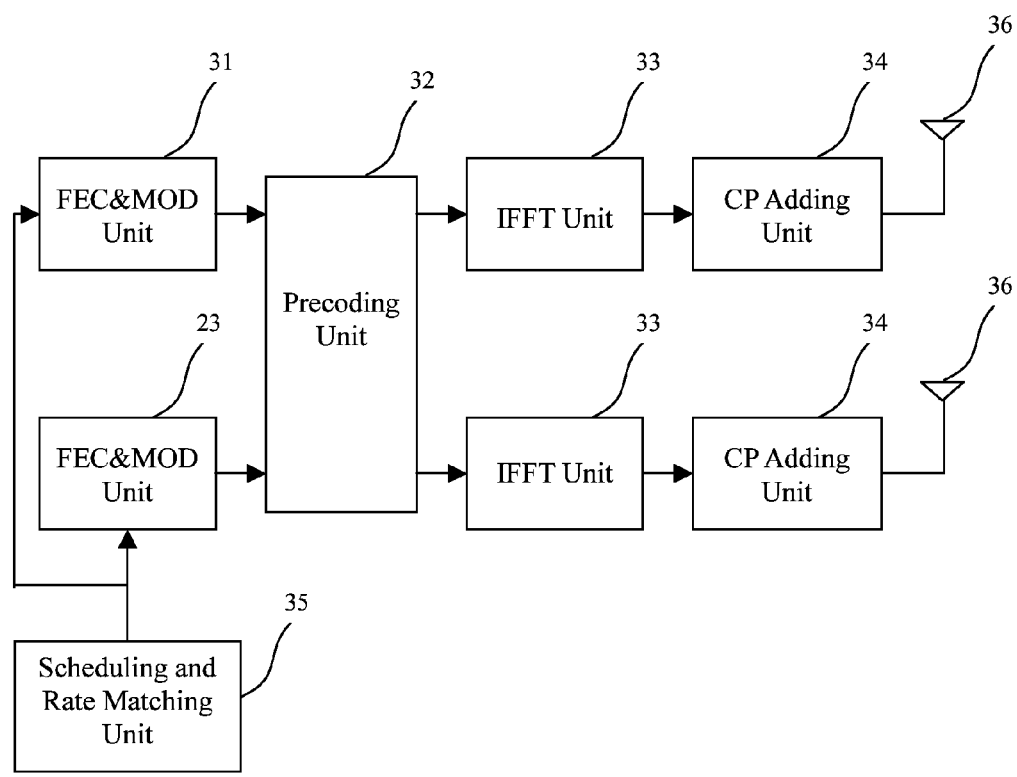
FIG. 5 is a schematic block diagram of the base station of the first embodiment.

FIG. 5 is a schematic block diagram of the base station in the first embodiment. As shown in FIG. 5, the base station comprises a plurality of transmitting antennas 36, and an FEC&Mod unit 31 (FEC: "Forward Error Correction", a kind of channel coding), an IFFT (Inverse Fast Fourier Transform) unit 33 and a CP adding unit 34, number of which corresponds to the number of the transmitting antennas 31, and a precoding unit 32, a scheduling and rate matching unit 35.

The scheduling and rate matching unit 35 is equipped with a codebook that contains the same contents as that in all user equipments, group users having the matching codeword, and schedules and determines the data rate based on the CQI (Channel Quality Indictor) and PVI (Precoding Vector Index) feedbacked from the user equipments. The FEC&Mod unit 31 performs channel-coding and modulation on the data for each user. The precoding unit 32 precodes the user data with the determined precoding vectors, and combines data from all users. The IFFT unit 33 performs IFFT transformation on the precoded data, and the CP adding unit 34 adds Cyclic Prefix (CP) to the IFFT-transformed data, then the transmitting antennas 31 transmit the data.

Features of the first embodiment reside in the feedback unit 17 and the scheduling and rate matching unit 35. Now description will be made in detail to the feedback unit 17 and the scheduling and rate matching unit 35.

For convenience, the number of transmitting antennas at base station (BS) side is set to N, each user equipment has one receiving antenna, the number of stream for each user is set to 1 (the number of receiving antenna and the number of streams are not concerned in the present invention, and as described above, the user equipment can have plural receiving antennas), the number of user equipments waiting for scheduling is K, and the codebook W consists of L unitary or non-unitary codewords, $$W=\{w_1,\ldots,w_L\} \quad (5)$$

In the first embodiment, the scheduling and rate matching unit 35 is to find the best transmission mode between MU-MIMO and SU-MIMO, where, in SU-MIMO, one user with the best performance metric is selected among all K user equipments (sometimes simply referred to as "user" hereinafter), while in MU-MIMO mode, a pair of two users with the best performance metric is selected among all candidate pairs which satisfy the codeword pairing condition described in the following text.

For sake of convenience, users k and j are taken as example to describe the first embodiment, assuming codewords of users k and j satisfy the pairing condition of "perfect match" or "half match" described in the following case 1 and case 2. There may exist more than one pair of users satisfying the pairing conditions, in such a case, the best pair is determined. If there is no pair of users satisfying the pairing condition, the base station switches to SU-MIMO mode, allowing only one user to transmit.

In the first embodiment, the feedback unit 17 of each of user j and user k generates and feedbacks two groups of parameters, respectively: the maximum SNR and corresponding codeword index, and the minimal SNR and corresponding codeword index, as denoted by the following equations.

$$w_1^k = \underset{w_i \in W}{\operatorname{argmax}}\left(\frac{\|H^k w_i\|^2}{\sigma^2}\right),\ CQI_1^k = \frac{\|H^k w_1^k\|^2}{\sigma^2} \quad (6)$$

$$w_2^k = \underset{w_i \in W}{\operatorname{argmin}}\left(\frac{\|H^k w_i\|^2}{\sigma^2}\right),\ CQI_2^k = \frac{\|H^k w_2^k\|^2}{\sigma^2}$$

Specifically, the CQI calculating unit 18 calculates a CQI value for each codeword in the codebook 20, the PVI determination unit 19 determines the largest one among the calculated values as $CQI_1^k$, and determines the index of the codeword corresponding to $CQI_1^k$ as $w_1^k$. On the other hand, the PVI determination unit 19 determines the smallest one among the calculated values as $CQI_2^k$, and determines the index of the codeword corresponding to $CQI_2^k$ as $w_2^k$.

In other words, $w_1^k$ is the codeword user k most expects, $w_2^k$ is the codeword user k hope the other user to use. The two kinds of CQI reflect the effective channel gain and effective interference power.

The transmitting unit 21 of user k transmits $w_1^k$, $w_2^k$ and corresponding $CQI_1^k$, $CQI_2^k$ to the base station via uplink channel.

Similarly, user j generates $w_1^j$, $w_2^j$ and corresponding $CQI_1^j$, $CQI_2^j$. Then the transmitting unit 21 of user j transmits $w_1^j$, $w_2^j$ and corresponding $CQI_1^j$, $CQI_2^j$ to the base station via uplink channel.

$w_1^k$, $w_2^k$, $w_1^j$, $w_2^j$ and corresponding $CQI_1^k$, $CQI_2^k$, $CQI_1^j$, $CQI_2^j$ are received by the base station and transferred to the scheduling and rate matching unit 35. The scheduling and rate matching unit 35 schedules user k and user j based on the feedback $w_1^k$, $w_2^k$, $w_1^j$, $w_2^j$.

These two users are paired if their codewords satisfy the following "perfect match" or "half match" condition.

Case 1: Perfect Match

In this case, $w_1^k$ and $w_2^k$ match $w_1^j$, $w_2^j$ perfectly, i.e., $$w_1^k = w_2^j \text{ And } w_2^k = w_1^j \tag{7}$$

The effective SINR (ESINR) for each user can be calculated as:

$$ESINR_k = \frac{0.5 * CQI_1^k}{1 + 0.5 * CQI_2^k}, ESINR_j = \frac{0.5 * CQI_1^j}{1 + 0.5 * CQI_2^k} \tag{8}$$

Here, it is assumed that each user gets half of the total transmission power. In effect, for each user, the effective SINR is obtained by taking $CQI_1$ as the signal power, $CQI_2$ as the interference from the other user in the pair. With this information, the base station can deduce the optimum performance metric, for example, the sum rate $R_1$ supported by the system when simultaneously transmitting data for user j and user k, which can be calculated by:

$$R_1 = \log_2\left(1 + \frac{p}{2}ESINR_k\right) + \log_2\left(1 + \frac{p}{2}ESINR_j\right) \tag{9}$$

here, the total transmission power is fixed top.

Case 2: Half Match

In this case, $w_1^k$ matches $w_2^j$ while $w_2^k$ does not match $w_1^j$, or $w_2^k$ match while $w_1^k$ does not matches $w_2^j$, i.e., $$w_1^k = w_2^j \text{ or } w_2^k = w_1^j \tag{10}$$

In this description, it is assumed $w_1^k = w_2^j$, and it is the same when $w_2^k = w_1^j$.

In this case, $w_1^k$, the codeword user k expects, and $w_2^j$, the codeword user j expects user k to use, is coincident. But $w_2^k$, the codeword user k expects user j to use, is not equal to $w_1^k$, the codeword that user j expects, i.e., $$w_1^k = w_2^j \text{ And } w_2^k \neq w_1^j \tag{11}$$

The scheduling and rate matching unit 35 determines that user k use codeword $w_1^k$. For user j, the scheduling and rate matching unit 35 judges whether a codeword correlation between $w_2^k$ and is greater than a predefined threshold $\rho_{th}$, $$|w_2^{k*}(w_1^j)^T| \geq \rho_{th} \tag{12}$$

If the condition indicated by formula 12 is not satisfied, the scheduling and rate matching unit 35 determines that user k and user j can not be paired, on the other hand, if this condition is satisfied, the scheduling and rate matching unit 35 assumes a MU-MIMO mode and pairs user k and user j, and the codeword for user j is determined as $$w^j = w_2^k \tag{13}$$

In this case, the effective SINR for user k can be precisely estimated by formula 14, assuming that the transmission power is allocated equally between users k and j.

$$ESINR_k = \frac{0.5 * CQI_1^k}{1 + 0.5 * CQI_2^k} \tag{14}$$

In addition, the effective SINR for user j can be described as:

$$ESINR_j = \frac{0.5 * \|H^j w_2^k\|^2}{1 + 0.5 * CQI_2^j} \tag{15}$$

Here, the estimation of $\|H^j w_2^k\|^2$ depends on the estimated $H^j$. In the invention, $H^j$ is approximated by linear combination of $w_1^j$ and $w_2^j$, i.e.

$$H^j \approx \alpha^j \cdot (w_1^j)^T + \beta^j \cdot (w_2^j)^T$$

$$\text{s.t. } \|H^j w_1^j\|^2 = CQI_1^j; \|H^j w_2^j\|^2 = CQI_2^j \tag{16}$$

the scalar $\alpha^j$ and $\beta^j$ can be calculated as:

$$\alpha^j = \frac{\sqrt{CQI_1^j} - (\rho^j)^* \cdot \sqrt{CQI_2^j}}{1 - |\rho^j|^2}, \tag{17}$$

$$\beta^j = \frac{\sqrt{CQI_2^j} - \rho^j \cdot \sqrt{CQI_1^j}}{1 - |\rho^j|^2}$$

Where, $$\rho^j = (w_1^j)^T w_2^j \tag{18}$$

In this case, the sum rate can be computed as:

$$R_2 = \log_2\left(1 + \frac{p}{2}ESINR_k\right) + \log_2\left(1 + \frac{p}{2}ESINR_j\right) \tag{19}$$

Here, same as case 1, the sum rate can be any other performance metric which is defined as prescribed function of effective SINRs.

If there are more than one pair of users satisfying the above-described pairing condition among all K users, the scheduling and rate matching unit 35 compute the sum rate of each pair by processes described above, and determines one pair with the highest sum rate, as shown as:

$$\text{Pair\_Index} = \underset{g \in \{1, \ldots, G\}}{\operatorname{argmax}} (\max(R_1^g, R_2^g)) \tag{20}$$

$$R_{MU-MIMO} = \underset{g \in \{1, \ldots, G\}}{\max} (\max(R_1^g, R_2^g)) \tag{21}$$

here, G is the number of pair of users satisfying the pairing condition, $(R_1^g, R_2^g)$ is the sum-rate of pair g.

If there is no pair of users satisfying the above-described perfect match or half match condition, the scheduling and rate matching unit 35 switches to SU-MIMO mode, scheduling only one user with the best $CQI_1$ among all K users.

$$\text{User\_Index} = \underset{i \in \{1, \ldots, K\}}{\operatorname{argmax}} (\log_2(1 + pCQI_1^i)) \tag{22}$$

$$R_{SU-MIMO} = \underset{i \in \{1, \ldots, K\}}{\max} \left(\log_2\left(1 + \frac{p}{2}CQI_1^i\right)\right) \tag{23}$$

here, $CQI_1^i$ is the biggest CQI of user i.

It is to be noted that even if there exist pair(s) of user satisfying the pairing condition, the base station can compute the best performance metric for SU-MIMO as shown in equation (23).

The scheduling and rate matching unit 35 in the base station compare the performance metric for MU-MIMO and SU-MIMO, and switches to the mode with preferred performance metric. For example, the scheduling and rate matching unit 35 selects a mode with the bigger sum-rate from $R_{MU-MIMO}$ and $R_{SU-MIMO}$ as shown in equation (21) and (23). After deciding the transmission mode, MU-MIMO or SU-MIMO mode, the scheduling and rate matching unit 35 decide the data rate for the user in SU-MIMO mode, or the data rates for each user in MU-MIMO mode. In SU-MIMO mode, the data rate can be directly determined by the $CQI_1$ of the selected user, with predetermined mapping function, such as capacity or transmission error rate. When in MU-MIMO mode, the data rate for each user can be directly determined by the effective CQI of each user of the selected pair, by predetermined mapping function, such as capacity or transmission error rate.

According to the first embodiment of the invention, the user equipments feedback to the base station not only codeword excepted to be used by itself, but also codeword expected to be used by the other user equipment, and the base station schedule users based on the feedback codewords. With this configuration, users can be scheduled appropriately, more advantageously, adaptive switch between MU-MIMO and SU-MIMO is enabled without loss of throughput. Furthermore, effective SINR can be determined more accurately, and sufficient throughput gain can be guaranteed.

[Second Embodiment]

The above described first embodiment is directed to the case that the base station select one pair of users for transmission when operating in MU-MIMO mode. However, the invention is not limited to this case, and can be applied to the case that the base station select one group of more than 2 user equipments for transmission in MU-MIMO mode. In the second embodiment, the base station supports 3-user simultaneous transmission in MU-MIMO mode.

The second embodiment will be described in detail as follows. The structure of the user equipment and the base station in the second embodiment are same as that in the first embodiment. In the following, the reference numerals of the first embodiment are adopted, the descriptions of the same parts are omitted, and emphasis is laid on the different parts.

In the second embodiment, the base station group three user equipments, for example, user j, user k and user z together if they satisfy the grouping condition as described in the following text. There may be more than one group among the K users, in such a case, the base station determines a group with preferred performance metric. If there is no users satisfying the grouping condition, the base station switches to SU-MIMO mode, selecting only one user for transmission.

Assuming there are K users in total, and users j, k, z are taken as example to describe the second embodiment.

The feedback unit 17 of each of users j, k and z generates and feedbacks three groups of parameters, respectively: the maximum SNR and corresponding codeword index, and two smallest SNRs and corresponding codeword index, as denoted by the following equations.

$$w_1^k = \underset{w_i \in W}{\operatorname{argmin}}\left(\frac{\|H^k w_i\|^2}{\sigma^2}\right), CQI_1^k = \frac{\|H^k w_1^k\|^2}{\sigma^2} \quad (24)$$

$$w_2^k = \underset{w_i \in W}{\operatorname{argmin}}\left(\frac{\|H^k w_i\|^2}{\sigma^2}\right), CQI_2^k = \frac{\|H^k w_2^k\|^2}{\sigma^2}$$

-continued $$w_3^k = \underset{w_i \in W, w_i \neq w_2^k}{\operatorname{argmin}}\left(\frac{\|H^k w_i\|^2}{\sigma^2}\right), CQI_3^k = \frac{\|H^k w_3^k\|^2}{\sigma^2}$$

Specifically, the CQI calculating unit 18 calculates a CQI value for each codeword in the codebook 20, the PVI determination unit 19 determines the largest one among the calculated values as $CQI_1^k$, and determines the index of the codeword corresponding to $CQI_1^k$ as $w_1^k$. On the other hand, the PVI determination unit 19 determines the smallest two values among the calculated as $CQI_2^k$ and $CQI_3^k$, and determines the index of the corresponding codeword as $w_2^k$ and $w_3^k$, respectively.

In other words, $w_1^k$ is the codeword user k most expects, $w_2^k$ and $w_3^k$ are the codeword user k hope the other two users to use. The two kinds of CQI reflect the effective channel gain and effective interference power.

Similarly, user j generates $w_1^j$, $w_2^j$ and $w_3^j$ and corresponding $CQI_1^j$, $CQI_2^j$ and $CQI_3^j$. user z generates $w_1^z$, $w_2^z$ and $w_3^z$ and corresponding $CQI_1^z$, $CQI_2^z$ and $CQI_3^z$ Then the transmitting unit 21 of each user equipment transmits these three groups of PVIs and CQIs to the base station via uplink channel.

At the base station $w_1^k$, $w_2^k$, $w_3^k$ and corresponding $CQI_1^k$, $CQI_2^k$, $CQI_3^k$ from user k, $w_1^j$, $w_2^j$, $w_3^j$ and corresponding $CQI_1^j$, $CQI_2^j$, $CQI_3^j$ from user j, and $w_1^z$, $w_2^z$, $w_3^z$ and corresponding $CQI_1^z$, $CQI_2^z$, $CQI_3^z$ from user z are received and transferred to the scheduling and rate matching unit 35. The scheduling and rate matching unit 35 schedules user k, j and z based on the feedback $w_1^k$, $w_2^k$, $w_3^k$, $w_1^j$, $w_2^j$, $w_3^j$ and $w_1^z$, $w_2^z$ and $w_3^z$.

In the second embodiment, the grouping condition includes only a "perfect match", which differs from the first embodiment.

Case 1: Perfect Match

These three users can be grouped if their codewords satisfy the condition:

$w_1^k$=any of $\{w_2^j, w_3^j, w_2^z, w_3^z\}$ And $w_1^j$=any of $\{w_2^k, w_3^k, w_2^z, w_3^z\}$ And $w_1^z$=any of $\{w_2^j, w_3^j, w_2^k, w_3^k\}$ \hfill (25)

The effective SINR for each user can be easily calculated as:

$$ESINR_k = \frac{1/3 * CQI_1^k}{1 + 1/3 * (CQI_2^k + CQI_3^k)} \quad (26)$$

$$ESINR_j = \frac{1/3 * CQI_1^j}{1 + 1/3 * (CQI_2^j + CQI_3^j)}$$

$$ESINR_z = \frac{1/3 * CQI_1^z}{1 + 1/3 * (CQI_2^z + CQI_3^z)}$$

Here, it is assumed that each user gets ⅓ of the total transmission power. In effect, for each user, the effective SINR is obtained by taking the biggest CQI as the signal power and the two smallest CQIs as the interference from the other two users in the group. With this information, the base station can deduce the optimum performance metric, for example, the sum rate $R_1$ supported by the system when simultaneously transmitting data for user k, j and z, which can be calculated by:

$$R_1 = \qquad (27)$$
$$\log_2\left(1 + \frac{p}{3}ESINR_k\right) + \log_2\left(1 + \frac{p}{3}ESINR_j\right) + \log_2\left(1 + \frac{p}{3}ESINR_z\right)$$

here, it is assumed that the total transmitted power is fixed to p.

If there are more than one group of users satisfying the above-described grouping condition among K users, the scheduling and rate matching unit 35 computes the sum rate of each group by processes described above, and select one group with the highest sum rate:

$$\text{Group\_Index} = \underset{g \in \{1, \ldots, G\}}{\operatorname{argmax}} (R_1^g) \qquad (28)$$

$$R_{MU-MIMO} = \underset{g \in \{1, \ldots, G\}}{\max} (R_1^g) \qquad (29)$$

here, G is the number of groups satisfying the grouping condition, $(R_1^g)$ is the sum-rate of group g.

If there is no user satisfying the group condition, the scheduling and rate matching unit 35 switches to SU-MIMO mode, scheduling only one user with the best $CQI_1$ among all K users:

$$\text{User\_Index} = \underset{i \in \{1, \ldots, K\}}{\operatorname{argmax}} (\log_2(1 + pCQI_1^i)) \qquad (30)$$

$$R_{SU-MIMO} = \underset{i \in \{1, \ldots, K\}}{\max} \left(\log_2\left(1 + \frac{p}{2}CQI_1^i\right)\right) \qquad (31)$$

It is to be noted that even if there exist group(s) of user satisfying the pairing condition, the base station can compute the best performance metric for SU-MIMO as shown in equation (31).

The scheduling and rate matching unit 35 in the base station compare the performance metric for MU-MIMO and SU-MIMO, and switches to the mode with preferred performance metric. For example, the scheduling and rate matching unit 35 selects a mode with the bigger sum-rate from $R_{MU-MIMO}$ and $R_{SU-MIMO}$ as shown in equation (29) and (31). After deciding the transmission mode, MU-MIMO or SU-MIMO mode, the scheduling and rate matching unit 35 decide the data rate for the user in SU-MIMO mode, or the data rates for each user in MU-MIMO mode. In SU-MIMO mode, the data rate can be directly determined by the $CQI_1$ of the selected user, with predetermined mapping function, such as capacity or transmission error rate. When in MU-MIMO mode, the data rate for each user can be directly determined by the effective CQI of each user of the selected group, by predetermined mapping function, such as capacity or transmission error rate.

According to the second embodiment of the invention, the user equipments feedback to the base station not only codeword excepted to be used by itself, but also codewords expected to be used by other user equipments, and the base station schedule users based on the feedback codewords. With this configuration, users can be scheduled appropriately, more advantageously, adaptive switch between MU-MIMO and SU-MIMO is enabled without loss of throughput. Furthermore, Effective SINR can be determined more accurately, and sufficient throughput gain can be guaranteed.

[Other Embodiments]

In the above described first and second embodiments, the communication system is exemplified as an OFDM wireless communication system. However, the present invention is not limited to OFDM system, rather, the invention is independent of the multiplexing scheme, and can be applied in any MIMO communication system.

In the above described first and second embodiments, the number of receiving antennas of the user equipment is exemplified as 1, however, the invention is independent of the number of receiving antennas of the user equipment, and the invention can be applied to user equipment having more than one receiving antennas.

In addition, in the first embodiment, the pairing condition includes "perfect match" and "half match". However, the pairing condition can include only a condition of "perfect match", so that the schedule process can be simplified.

In addition, In the above described first and second embodiments, the base station select one pair of users, or one group of three users, to transmit simultaneously, respectively, however, as can be understood from the above description, the invention can be applied to any number of users supported by the base station to transmit simultaneously.

In addition, in the second embodiment, the base station switches to SU-MIMO mode if there is no user satisfying the grouping condition, however, the invention can be modified that the base station switches to a 2-user MU-MIMO mode described in the first embodiment in such a case.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A precoding method in a multiple input multiple output (MIMO) wireless communication system, wherein the MIMO wireless communication system comprises at least one base station having multiple transmitting antennas and at least one user equipment having at least one receiving antenna, the base station is capable of accommodating plural user equipments by precoding based on a codebook, the method comprising:

each of the plural user equipments
conducting a channel estimation based on a pilot signal transmitted from the base station, to obtain a channel information;
determining a first codeword that results in the maximum signal-noise-ratio (SNR), and at least one second codeword that results in the minimum SNR, based on the channel information; and
feedbacking the first codeword and the second codeword(s) to the base station, and the base station
scheduling the user equipments based on the first codeword and the second codeword(s) so that said first codeword determined by one user equipment, among user equipments engaging in multi user (MU)-MIMO transmission simultaneously, matches said second codeword determined by other user equipments, and a predetermined system performance metric is optimized, when it is in a MU-MIMO mode;

further comprising:
each of the plural user equipments calculating and feeding back to the base station a first channel quality indictor (CQI) value corresponding to the first codeword, and at least one second CQI value corresponding respectively to the at least one second codeword; and the base station switching between multi-user MIMO (MU-MIMO) mode and single-user MIMO (SU-MIMO) mode based on the first codeword and the second codeword(s), and corresponding CQIs;

wherein the switching comprises:

determining the maximum system performance metric in SU-MIMO mode, based on the feedbacked codewords and corresponding CQIs from all the users in the system;

determining the maximum system performance metric in MU-MIMO mode, based on the feedbacked codewords and corresponding CQIs from all the users in the system; and switching to SU-MIMO mode if the maximum system performance metric in SU-MIMO mode is higher than the maximum system performance metric in MU-MIMO mode, and to MU-MIMO mode if the maximum system performance metric in SU-MIMO mode is not higher than the maximum system performance metric in MU-MIMO mode.

2. The method of claim 1, wherein determining the maximum system performance metric in SU-MIMO mode further comprises:

determining an user with the best performance metric; and
setting the performance metric of the determined user as the maximum performance metric in SU-MIMO mode.

3. The method of claim 1, wherein determining the maximum system performance metric in MU-MIMO mode further comprises:

grouping users based on matching of the first codeword and the second codeword(s);
determining a system performance metric for each group;
determining the maximum performance among the groups; and
setting the maximum performance as the system performance metric in MU-MIMO mode.

4. The method of claim 3, wherein determining the system performance metric for each group further comprises:

determining an effective CQI for each user in the group by taking the first CQI as transmission power, and the second CQI(s) as interference power from other users.

5. The method of claim 1, further comprising
the base station determining data rate for each user equipment based on the first codeword and the second codeword(s), and corresponding CQIs.

6. The method of claim 1, wherein said system performance metric is a system throughput of the MIMO wireless communication system.

7. A multiple input multiple output (MIMO) wireless communication system, which comprises at least one base station having plural transmitting antennas and at least one user equipment having at least one receiving antennas, the base station being capable of accommodating plural user equipments by precoding based on a codebook, wherein, each of the plural user equipments comprises:

a channel estimation unit for conducting a channel estimation based on a pilot signal transmitted from the base station, to obtain a channel information;

a codeword determination unit for determining a first codeword that results in the maximum signal-noise-ratio (SNR), and at least one second codeword that results in the minimum signal-noise-ratio, based on the channel information; and a transmission unit for feedbacking the first codeword and the second codeword(s) to the base station, the base station is configured to schedule the user equipments based on the first codeword and the second codeword so that said first codeword determined by one user equipment, among user equipments engaging in multi user (MU)-MIMO transmission simultaneously, matches said second codeword determined by other user equipments, and a predetermined system performance metric is optimized, when it is in a MU-MIMO mode;

wherein the codeword determination unit further calculates a first channel quality indictor (CQI) value corresponding to the first codeword, and at least one second CQI value corresponding respectively to the at least one second codeword, the transmission unit further feedbacks the first CQI value and the second CQI value(s) to the base station;

wherein the base station is further configured to switch between multi-user MIMO (MU-MIMO) mode and single-user MIMO (SU-MIMO) mode based on the first codeword and the second codeword(s) and corresponding CQIs, by determining the maximum system performance metric in SU-MIMO mode, based on the feedbacked codewords and corresponding CQIs from all the users in the system;

determining the maximum system performance metric in MU-MIMO mode, based on the feedbacked codewords and corresponding CQIs from all the users in the system; and switching to SU-MIMO mode if the maximum system performance metric in SU-MIMO mode is higher than the maximum system performance metric in MU-MIMO mode, and to MU-MIMO mode if the maximum system performance metric in SU-MIMO mode is not higher than the maximum system performance metric in MU-MIMO mode.

8. The MIMO wireless communication system of claim 7, wherein the base station is further configured to determine an user with the best performance metric; and
set the performance metric of the determined user as the maximum performance metric in SU-MIMO mode.

9. The MIMO wireless communication system of claim 7, wherein the base station is further configured to group users based on matching of the first codeword and the second codeword(s);
determine a system performance metric for each group;
determine the maximum performance among the groups; and
set the maximum performance as the system performance metric in MU-MIMO mode.

10. The MIMO wireless communication system of claim 9, wherein the base station is further configured to determine an effective CQI for each user in the group by taking the first CQI as transmission power, and the second CQI(s) as interference power from other users.

11. The MIMO wireless communication system of claim 7, wherein the base station is further configured to determine data rate for each user equipment based on the first codeword and the second codeword(s), and corresponding CQIs.

12. The MIMO wireless communication system of claim 7, wherein said system performance metric is a system throughput of the MIMO wireless communication system.

* * * * *